United States Patent [19]

Raudys

[11] Patent Number: 4,683,617
[45] Date of Patent: Aug. 4, 1987

[54] DISPOSABLE TENSION SLEEVE FOR A STUFFING MACHINE

[75] Inventor: Vytas A. Raudys, Chicago, Ill.

[73] Assignee: Viskase Corporation, Chicago, Ill.

[21] Appl. No.: 900,573

[22] Filed: Aug. 26, 1986

[51] Int. Cl.4 .............................................. A22C 11/00
[52] U.S. Cl. ......................................... 17/41; 17/1 R
[58] Field of Search ........................ 17/1 R, 41, 49, 35

[56] References Cited

U.S. PATENT DOCUMENTS

Re. 30,265  5/1980  Kupcikevicius .
4,202,075   5/1980  Michel et al. .
4,439,890   4/1984  Kazaitis .
4,512,059   4/1985  Beckman .
4,521,938   6/1985  Kupcikevicius .
4,570,292   2/1986  Wallace .

Primary Examiner—Willie G. Abercrombie
Attorney, Agent, or Firm—Roger Aceto

[57] ABSTRACT

A disposable tension sleeve for a stuffing machine having a snap-lock connector component at one end which is detachably attachable to either a male connector or a female connector on the stuffing machine.

12 Claims, 9 Drawing Figures

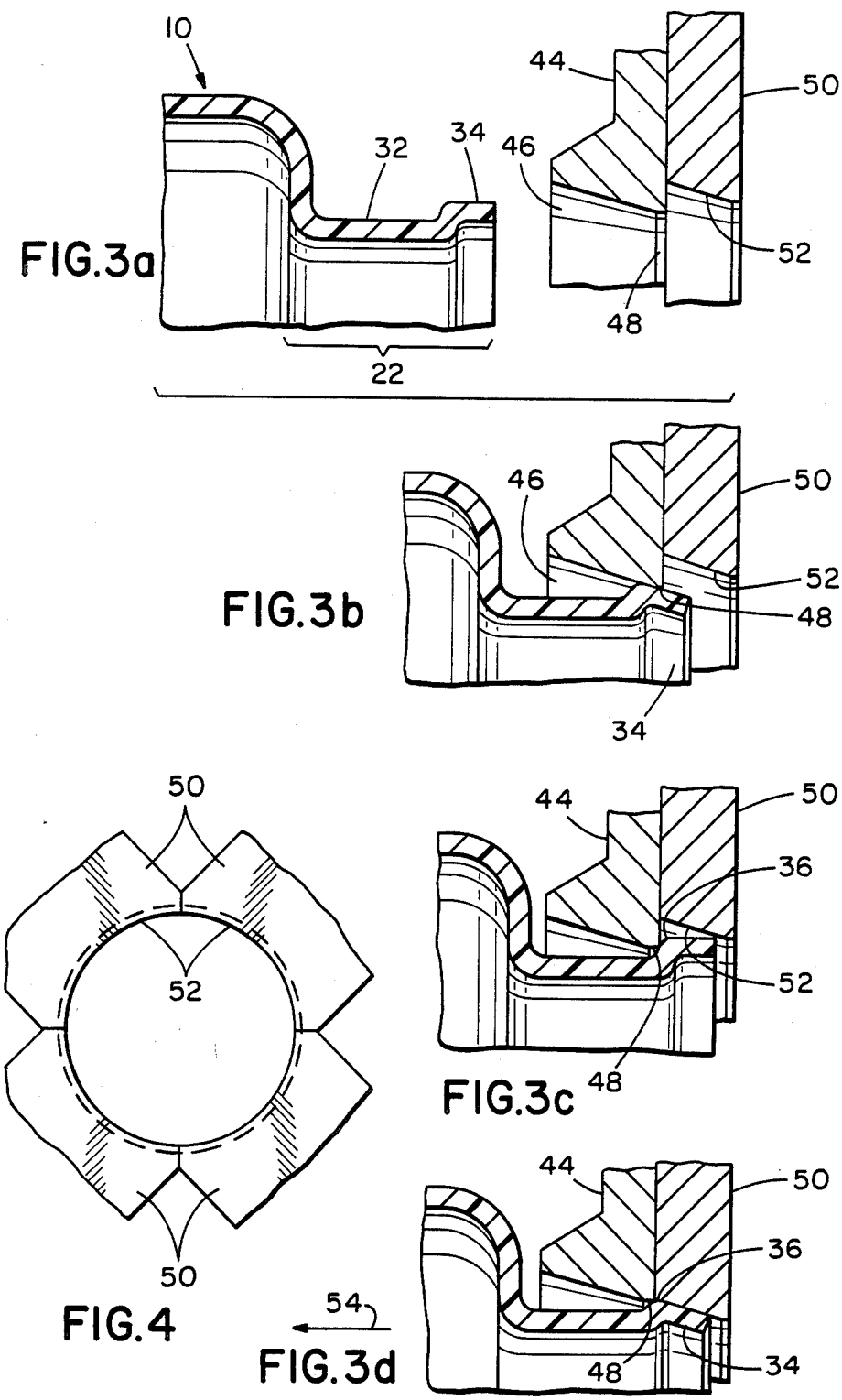

DISPOSABLE TENSION SLEEVE FOR A STUFFING MACHINE

FIELD OF THE INVENTION

The present invention relates to a disposable tension sleeve releasably attachable to a stuffing machine and, in particular, to connector means on the sleeve for snap-on attachment either to a female or to a male connector means of the stuffing machine.

BACKGROUND OF THE INVENTION

The function of a stuffing machine tension sleeve is well known in the food stuffing art and reference is made to U.S. Pat. No. Re. 30,390 for a detailed description of the function and operation of the tension sleeve. It is sufficient for purposes of the present invention to say that the tension sleeve described in U.S. Pat. No. Re. 30,390 is constructed of metal and is intended to be a permanent structural element of the stuffing machine. A shirred casing stick, which has a bore diameter larger than the outside diameter of the sleeve, is slipped over the sleeve until the fore end of the sleeve extends through the bore of the shirred stick. The shirred stick is then positioned on the sleeve and mounted thereto by a sizing means detachably secured to the fore end.

In more recent developments, the shirred casing stick has been placed on a disposable sleeve by the casing manufacturer. The sleeve is then attached to the stuffing machine and is removed and discarded after the casing supply on the sleeve is exhausted.

One advantage of having the casing manufacturer place casing on a disposable sleeve is that the user can be supplied with a greater length of casing than if a disposable sleeve were not used. This is because the bore of the shirred casing must be large enough to slide easily over the stuffing machine tension sleeve. However, when the casing is placed on a disposable sleeve by the casing manufacturer, the clearance between the shirred casing and the sleeve is reduced or eliminated entirely. Thus, the clearance space otherwise needed for the shirred stick to slip on to the metal tension sleeve of the stuffing machine is occupied instead by some quantity of shirred casing.

Connector means for releasably joining the disposable sleeve to a stuffing machine are shown for example in U.S. Pat. Nos. 4,521,938 and 4,570,292. These Patents disclose disposable sleeves equipped with various configurations of male or female connector elements for joining to a mating connector on the stuffing machine.

In U.S. Pat. No. 4,521,938 the sleeve has a plurality of separate fingers which snap into place over a male component of the stuffing machine. U.S. Pat. No. 4,570,292 discloses two connector embodiments; one wherein a male bayonet-type connector is on the sleeve; and another wherein a split flange is used as a female connector for clamping about a male component of the stuffing machine.

During use, the tension sleeve is periodically longitudinally reciprocated in short quick strokes about three inches or less in order to provide the slack casing needed for gathering and closing about the ends of the stuffed product. When a disposable tension sleeve is loaded with a full complement of shirred casing, as disclosed in these two Patents, the combined weight of the shirred casing and sleeve may be in excess of ten pounds. Accordingly, the connection between the sleeve and the stuffing machine must be strong enough to withstand the inertia of the article so as not to separate prematurely during use. On the other hand, the connection must be made and broken quickly and easily so that an operator can connect or disconnect the sleeve at will. For example, a minimum time period should be taken to remove a disposable sleeve after the casing supply is spent and to replace it with a new sleeve containing a full supply of shirred casing.

In the present invention the disposable sleeve is equipped with a connector component that is attachable in a snap-lock to a mating connector component on the stuffing machine. The snap-lock is such that it is strong enough to prevent the separation of the sleeve from the machine when the sleeve is reciprocated, yet is easily separated from the machine to replace the sleeve. A further advantage of the present invention is that it is adapted to mate with either a male or female snap-lock component on the stuffing machine.

SUMMARY OF THE INVENTION

The present invention may be characterized in one aspect thereof by a disposable tension sleeve for releasable attachment to a stuffing machine comprising:

(a) an elongated tube of substantially constant diameter for supporting a shirred length of casing, said tube having a fore end oriented towards the stuffing direction and an aft end;

(b) a circular snap-lock connector component coaxial with the longitudinal axis of said tube and longitudinally spaced in an aft direction from the aft end of said tube, said circular snap-lock connector component having a diameter larger that the diameter of said tube;

(c) a circular spacer strip coaxial with the longitudinal axis of said tube, said spacer strip being disposed between said aft end and said circular snap-lock connector component, and said spacer strip having a diameter larger than said snap-lock connector component;

(d) longitudinally spaced radial walls connecting opposite side edges of said spacer strip to said aft end and said circular snap-lock connector component respectively, said spacer strip and radial walls comprising separation means to prevent obstruction of said circular snap-lock connector component by shirred casing on said tube;

(e) said circular snap-lock connector component comprising a continuous circular section connected at one edge to one of said radial walls, and a continuous and unbroken circular lip extending longitudinally in an aft direction from an opposite edge of said circular section, said lip defining the end of said sleeve releasably connectable to the stuffing machine, and said lip being larger in diameter than the diameter of said circular section so as to form an external shoulder at the juncture between said lip and said circular section;

(f) said circular snap-lock connector component being resiliently radially deformable for snap connection to a mating connector on the stuffing machine; and (g) said snap-lock connector component having an outer peripherial surface, a portion of which is adapted to receive a pressing member thereagainst for inwardly deforming at least a portion of said snap-lock connector component radially to release its snap connection from the mating connector on the stuffing machine.

DESCRIPTION OF THE DRAWINGS

FIG. 3 (a)-(d) are views on an enlarged scale showing the connector means on the sleeve as a male component of a snap-lock connector and showing the sequence of steps for connecting and disconnecting the sleeve and the stuffing machine;

FIG. 4 is a schematic representation showing a right side view of FIG. 3 (d) on a smaller scale;

DESCRIPTION OF THE PREFERRED EMBODIMENT

Figure 1:
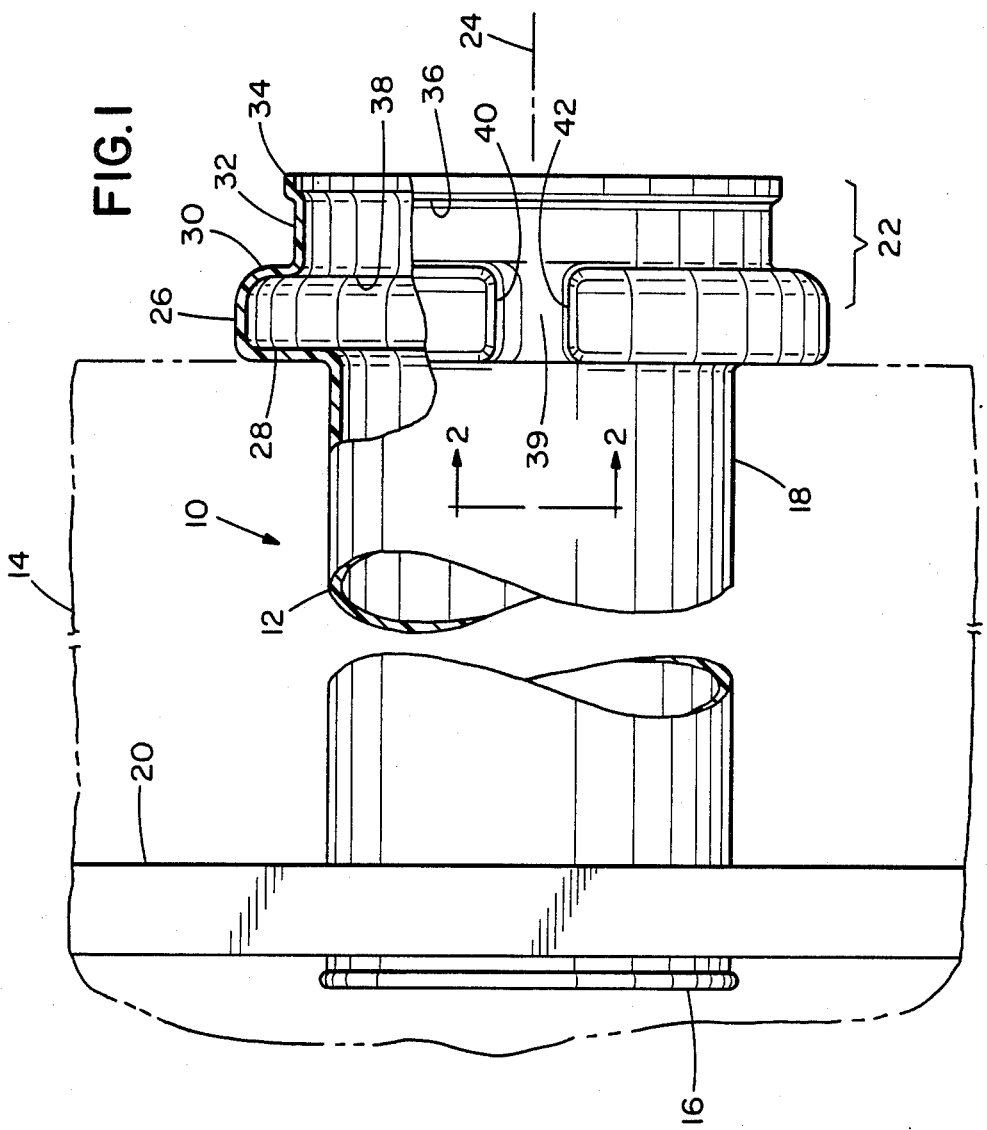
FIG. 1 is a side elevation view of the disposable tension sleeve of the present invention partly broken away and in section including a connector means on one end thereof.

FIG. 1 shows the disposable tension sleeve article of the present invention generally indicated at 10. The sleeve includes an elongated tube 12 for supporting a shirred length of casing. The shirred casing is shown in phantom line at 14.

Tube 12 has a fore end 16 oriented towards the stuffing direction and an aft end 18. Aft end 18 carries the components, as described hereinbelow, for joining the tube as a disposable tension sleeve to a stuffing machine (not shown) of the general type disclosed in U.S. Pat. No. Re. 30,390.

Attached to the fore end of tube 12 is a sizing means 20. The sizing means can be a disc, as illustrated, or a conical sizing element as disclosed, for example, in U.S. Pat. No. 4,570,292.

Longitudinally spaced in an aft direction from aft end 18 is a snap-lock connector component 22. The snap-lock connector component 22 is circular and is coaxial with the longitudinal axis 24 of tube 12 and has a diameter larger than the diameter of the tube.

FIG. 1 further shows that the snap-lock connector component 22 comprises a continuous and unbroken circular section 32 and a continuous and unbroken circular lip 34 extending longitudinally in an aft direction from about a rearward edge of circular section 32. Lip 34 is slightly larger in diameter than circular section 32 so as to form an external shoulder 36 at the juncture between the lip and the circular section. In the embodiment as shown, the height of external shoulder 36 is about equal to the wall thickness of the tube 12.

Between the tube aft end 18 and the snap-lock connector component 22 is a circular spacer strip 26. Spacer strip 26 is a coaxial with the longitudinal axis 24 of the tube and it has a diameter larger than the snap-lock connector component 22.

Depending from opposite side edges of spacer strip 26 are a pair of radial walls 28 and 30. These radial walls 28, 30 are connected respectively to the aft end 18 of the tube and to a forward edge of circular section 32. Since the spacer strip 26 is larger in diameter than circular section 32, an internal shoulder 38 is formed at the juncture between the radial wall 30 and the circular section.

If shirred casing 14 on tube 12 is highly compacted, it tends to expand longitudinally over time. The relatively large diameter abutment provided by radial wall 28 and the longitudinal spacing provided by spacer strip 26 act to prevent the casing from expanding rearwardly over and onto any portion of the snap-lock connector component 22. Accordingly, the spacer strip 26 and the spaced apart radial walls 28, 30 are arranged to cooperate and comprise a separation means to prevent obstruction of the snap-lock connector component 22 by shirred casing 14 on the tube.

Figure 2:
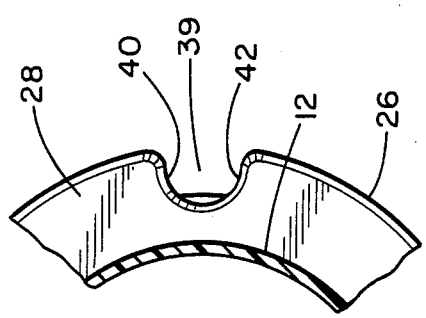
FIG. 2 is a view of a partial section of the disposable tension sleeve taken along line 2—2 of FIG. 1.

It may be desirable to increase the longitudinal rigidity of the separation means formed by radial walls 28, 30 and spacer strip 26. This may be done, for example, to insure that the separation means will be able to withstand the forces exerted thereon by the shirred casing pressing against wall 28. Rigidity can be increased by interrupting spacer strip 26 at diametrically opposite locations 39 (only one of which is shown in FIGS. 2 and 3) and to connect the radial walls 28, 30 at these locations by longitudinal wall sections 40, 42.

It should be appreciated that the components at the aft end on the disposable tension sleeve 10 including, for example, the spacer strip 26, radial walls 28, 30 and the circular section 32 may be made separately, or as subassemblies, and then joined to tube 12 by any suitable means such as by welding. The snap-lock connector component 22 should be formed of a material which permits it to be resiliently radially deformable so as to snap connect to either a mating male or a mating female connector on the stuffing machine. Preferably, fabrication is of a plastic material such as a high density polyethylene which is approved by the appropriate governmental agency for direct food contact. Manufacture from plastic also permits the tube 12 and the components at its aft end 18 to be made as an unitary article, as illustrated in FIG. 1, as by blow molding.

FIG. 3(a)-(d) illustrates the sequence of steps for snap-locking the disposable tension sleeve as a male component to a mating female component on the stuffing machine. the female component is a substantially non-yielding metallic ring 44. This metallic ring 44 is part of a reciprocating mechanism of the machine (otherwise not shown) and this ring reciprocates longitudinally when it is time to supply slack casing for gathering and closing about the ends of the stuffed product. The ring has a beveled circular opening 46 into which is inserted one end of the disposable tension sleeve 10. The smallest inside diameter of the ring, as defined by an innermost annular edge 48, is smaller than the outside diameter of lip 34 and is larger than the outside diameter of circular section 32.

FIG. 3(a) shows the male snap-lock connector component 22 axially aligned with and spaced forward of opening 46. In FIG. 3(b) the lip 34 is shown entering opening 46 and in contact with edge 48. Since annular edge 48 is smaller in diameter than the circular lip 34, the lip is resiliently deformed radially inward as it is pressed through the opening. As the lip passes through opening 46, its resiliency causes it to snap back to its initial configuration as shown in Figure 3(c), thereby engaging the external shoulder 36 against the edge 48 of ring 44. The difference in diameters between the inside diameter defined by edge 48 and the outside diameter defined by lip 34 is relatively small. For example, at a lip diameter of 3.25 inches, the smallest inside diameter of edge 48 can be about 3.125 inches so there is an interference of about 0.06 inch over the radius. However, since the contact between the edge 48 and external shoulder 36 is substantially continuous about the entire circumference, the holding power of the snap-lock connection therebetween is sufficient to prevent longitudinal separation as the sleeve and its supply of casing are reciprocated responsive to reciprocation of the ring 44.

FIG. 3 also shows a radially movable slide 50 positioned behind ring 44. There are four slides 50 positioned around the periphery of opening 46 for purposes setout hereinbelow. Each slide has a beveled inner periphery 52. When lip 34 is in the position as shown in FIG. 3(c), the lip is trapped between the slide 50 and ring 44. Trapping the lip 34 in this manner prevents excessive relative longitudinal movement between the snap-lock connector component 22 and the ring 44 when the ring is reciprocated.

The slides 50 (only one of which is shown) also comprises the means for effecting a separation of the lip 34 from ring 44 as illustrated in FIG. 3(d). The slides normally are in a position as shown in FIG. 3(a)–(c). To disconnect the lip 34 from ring 44, the slides move radially inward so the inner periphery 52 of each slide contacts and presses inwardly on the outer peripherial surface of lip 34. Inward deformation of lip 34 causes external shoulder 36 to slip under and around the edge 48 of ring 44. When this occurs, the resiliency of lip 34 causes it to spring radially outwardly, thereby, expelling the entire disposable sleeve longitudinally away from ring 44 in the forward direction indicated by arrow 54.

As best seen in FIG. 4, the inner periphery 52 of each slide is arcuate so that when the slides are pressed radially inward to the position shown in FIGS. 3(d) and 4, the inner peripheries 52 of the slides together define a substantially closed circle. This insures that the lip 34 is deformed uniformly radially inward so that the entire outer circumference of the external shoulder 36 can clear the edge 48.

Figure 5:
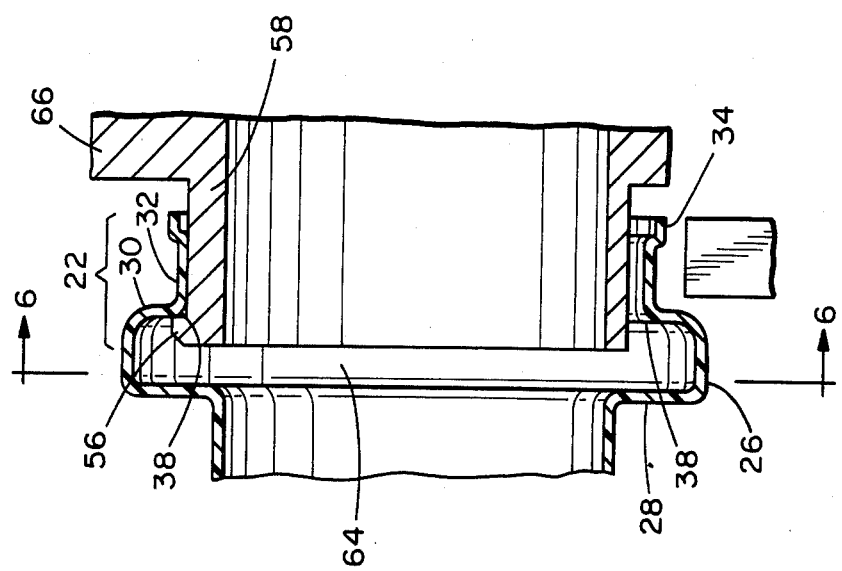
FIG. 5 is a view showing the connector means on the sleeve as a female component of a snap-lock connector.
Figure 6:
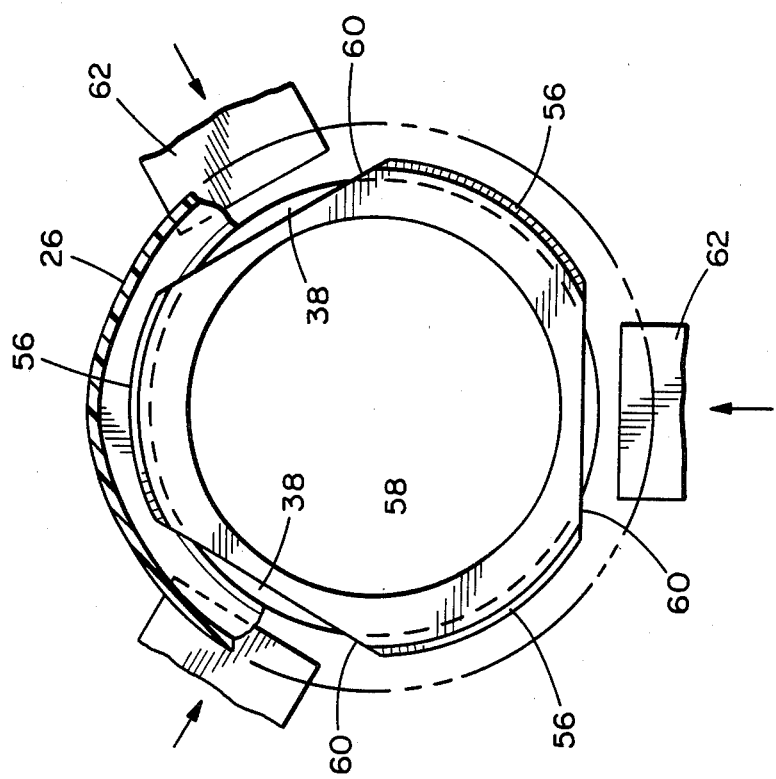
FIG. 6 is a view taken generally along lines 6—6 of FIG. 5 and showing a portion of the disposable sleeve in phantom line.

FIGS. 5 and 6 show use of the same snap-lock connector component 22 as a female component of a snap-lock connection. As shown in FIG. 5, the internal shoulder 38 at the juncture of radial wall 30 and circular section 32 provides a surface engagable against a ridge portion 56 of a mating male component 58.

In effecting this snap-lock connection, the lip 34 and circular section 32 are expanded outwardly in order to pass over the male component 58. When the internal shoulder 38 clears over the ridge portion 56, circular section 32 snaps back to its initial configuration so as to lock the internal shoulder 38 behind the ridge portion 56. This occurs when the ridge portion 56 is received in a space 64 defined between radial walls 28, 30.

As best seen in FIG. 6, there are multiple, and preferably three, ridge portions 56 disposed about the perimeter of male component 58. These ridge portions define arcs of a circle which has a diameter slightly greater than the inside diameter of circular strip 32. Between these arcuate ridge portions 56, the male component 58 is cut away to provide three lands 60. This configuration facilitates connecting and disconnecting the two components in a snap-lock.

As the snap-lock connector component 22 (FIG. 5) is forced over the male component 58, lip 34 and circular section 32 deform to the end view, out-of-round shape (FIG. 6) of male component 58 so that internal shoulder 38 can clear ridge portions 56. When ridge portions 56 are cleared, the snap-lock connector component 22 snaps back to its circular configuration to lock the internal shoulder 38 behind the ridge portions 56 (FIG. 5). An external flange 66 on the male connector limits the relative longitudinal movements between the snap-lock connector component 22 and male connector 58 when the male connector is reciprocated.

To disconnect, the snap-lock connector commponent 22 is pressed raidially inward at locations about its periphery so as to deform it to the end view, out-of-round shape of the male component and, thereby, allow the internal shoulder 38 to pass forward over ridge portions 56. Deformation of snap-lock connector component 22 on the disposable tension sleeve is accomplished by three pressing members 62 circumferentially spaced about the circular section. These pressing members move radially inward at the lands 60 to press against circular section 32.

It should be appreciated that the present invention provides a disposable sleeve which has a snap-lock connector component attachable either to a mating male, or a mating female connector on the stuffing machine. In either instance there is a positive locking of the sleeve so as to limit relative longitudinal movement between the disposable tension sleeve and the reciprocating mechanism of the stuffing machine to which the sleeve is attached. The snap-lock connector component comprises a continuous and unbroken circular section 32 and integral lip 34 which provide sufficient rigidity to maintain a snap-lock connection when the sleeve is employed as a tension sleeve. While the disposable sleeve 10 has been described as a tension sleeve, it could also be used as a disposable stuffing horn or as a non-reciprocating sleeve positioned over a stuffing horn.

Having thus described the invention in detail, what is claimed as new is:

1. A disposable tension sleeve for releasable attachment to a stuffing machine comprising:
    (a) an elongated tube of substantially constant diameter for supporting a shirred length of casing, said tube having a fore end oriented towards the stuffing direction and an aft end;
    (b) a circular snap-lock connector component coaxial with the longitudinal axis of said tube and longitudinally spaced in an aft direction from the aft end of said tube, said circular snap-lock connector component having a diameter larger than the diameter of said tube;
    (c) a circular spacer strip coaxial with the longitudinal axis of said tube, said spacer strip being disposed between said aft end and said circular snap-lock connector component, and said spacer strip having a diameter larger than said snap-lock connector component;
    (d) longitudinally spaced radial walls connecting opposite side edges of said spacer strip to said aft end and said circular snap-lock connector component respectively, said spacer strip and radial walls comprising separation means to prevent obstruction of said circular snap-lock connector component by shirred casing on said tube;
    (e) said circular snap-lock connector component comprising a continuous circular section connected at one edge to one of said radial walls, and a continuous and unbroken circular lip extending longitudinally in an aft direction from an opposite edge of said circular section, said lip defining the end of said sleeve releasably connectable to the stuffing machine, and said lip being larger in diameter than the diameter of said circular section so as to form an external shoulder at the juncture between said lip and said circular section;
    (f) said circular snap-lock connector component being resiliently radially deformable for snap connection to a mating connector on the stuffing machine; and (g) said snap-lock connector component having an outer peripherial surface, a portion of which is adapted to receive a pressing member thereagainst for inwardly deforming at least a portion of said snap-lock connector component radially to release its snap connection from the mating connector on the stuffing machine.

2. A disposable tension sleeve as in claim 1 wherein said circular snap-lock connector component is a male component and is resiliently deformable radially inward for insertion into a rigid mating female connector on the stuffing machine and wherein said external shoulder is snap engagable against the mating female connector to prevent the longitudinal separation of said sleeve and the stuffing machine in the stuffing direction.

3. A disposable sleeve as in claim 2 wherein said external shoulder is a continuous and unbroken surface extending about said circular section.

4. A disposable sleeve as in claim 3 wherein said outer peripheral surface of said snap-lock connector component on said lip and said lip is resiliently radially deformable inwardly to a smaller diameter, while maintaining its circular configuration, by means pressing inwardly about substantially the entire outer circumference of said lip, thereby, to release said external shoulder from engagement against the female connector.

5. A disposable sleeve as in claim 4 wherein said tube, spacer strip and circular snap-lock connector component comprise an integral blow molded unit.

6. A disposable sleeve as in claim 5 including shirred casing on said tube, one end of said shirred casing being butted against a forward one of said radial walls.

7. A disposable sleeve as in claim 5 including a casing sizing means on said tube at its fore end.

8. A disposable sleeve as in claim 1 wherein the height of said external shoulder is about equal to wall thickness of said tube.

9. A disposable sleeve as in claim 1 wherein said circular snap-lock connector component is a female component portions of which are resiliently radially deformable outwardly so as to provide it with an out-of-round configuration for forcible placement over a male connector on the stuffing machine, and wherein said circular snap-lock connector component is snap engagable with said male connector upon the resilient restoration of its circular configuration.

10. A disposable sleeve as in claim 9 wherein said radial walls define a receiving space therebetween and the circular configuration of said snap-lock connector component is restored upon reception of the male connector into said space, and wherein said circular section of said snap-lock connector component and the radial wall connected thereto define an internal shoulder engagable against said male connector to prevent longitudinal separation of said sleeve and the stuffing machine in the stuffing direction.

11. A disposable sleeve as in claim 10 wherein said internal shoulder defines a continuous and unbroken annular surface.

12. A disposable sleeve as in claim 10 wherein said circular section has an outer peripheral surface adapted to receive pressing members thereagainst at circumferentially spaced locations for deforming said circular snap-lock connector component to said out-of-round configuration to permit separation from said male connector.

* * * * *